US012409686B2

(12) United States Patent
Hoshiba (10) Patent No.: US 12,409,686 B2
(45) Date of Patent: Sep. 9, 2025

(54) PNEUMATIC TIRE AND METHOD FOR MANUFACTURING THE SAME

(71) Applicant: The Yokohama Rubber Co., LTD., Tokyo (JP)

(72) Inventor: Takashi Hoshiba, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 108 days.

(21) Appl. No.: 16/645,442

(22) PCT Filed: Aug. 31, 2018

(86) PCT No.: PCT/JP2018/032398
§ 371 (c)(1),
(2) Date: Mar. 6, 2020

(87) PCT Pub. No.: WO2019/049788
PCT Pub. Date: Mar. 14, 2019

(65) Prior Publication Data
US 2020/0282779 A1    Sep. 10, 2020

(30) Foreign Application Priority Data

Sep. 7, 2017  (JP) ................. 2017-172078

(51) Int. Cl.
*B60C 19/00*   (2006.01)
*B29D 30/06*   (2006.01)
*B60C 11/00*   (2006.01)

(52) U.S. Cl.
CPC ........ *B60C 19/002* (2013.01); *B29D 30/0681* (2013.01); *B60C 11/0008* (2013.01); *B60C 2011/0016* (2013.01)

(58) Field of Classification Search
CPC ..... B60C 19/002; B60C 19/12; B60C 19/122; B60C 19/125; B60C 11/0008; B60C 2011/0016; B29D 30/0681
(Continued)

(56) References Cited

U.S. PATENT DOCUMENTS 3,905,823 A * 9/1975 Piskoti .................... B29C 33/64
106/287.15
4,166,052 A    8/1979 Kusakabe et al.
(Continued)

FOREIGN PATENT DOCUMENTS

JP    2005-138760    6/2005
JP    2005-212524    8/2005
(Continued)

OTHER PUBLICATIONS

Atsushi Tanno, JP-2015128893-A, updated machine translation. (Year: 2015).*
(Continued)

*Primary Examiner* — Sedef E Paquette
(74) *Attorney, Agent, or Firm* — Thorpe North & Western (57) ABSTRACT

A pneumatic tire includes a sound absorbing member fixed to an inner surface of a tread portion via an adhesive layer in the tire circumferential direction. A thickness of the sound absorbing member 6 is 20 mm or greater, a hardness of the sound absorbing member is from 80 N/314 cm$^2$ to 150 N/314 cm$^2$, a tensile strength of the sound absorbing member 6 is 90 kPa or greater, an elongation at break of the sound absorbing member is 130% or greater, a JIS hardness of the tread rubber of the tread portion is from 50 to 68, and a plurality of sipes are provided in a land portion formed in the tread portion.

13 Claims, 3 Drawing Sheets

(58) Field of Classification Search
USPC ........................................................ 152/450
See application file for complete search history.

(56) References Cited

U.S. PATENT DOCUMENTS

| | | | | |
|---|---|---|---|---|
| 4,863,650 | A * | 9/1989 | Kohler | B29C 33/64 |
| | | | | 264/39 |
| 2005/0098251 | A1 | 5/2005 | Yukawa | |
| 2005/0161138 | A1 | 7/2005 | Yukawa et al. | |
| 2007/0089821 | A1 * | 4/2007 | Kishizoe | B60C 11/12 |
| | | | | 152/209.2 |
| 2007/0089824 | A1 * | 4/2007 | Yukawa | B60C 19/002 |
| | | | | 152/450 |
| 2009/0038726 | A1 * | 2/2009 | Yukawa | B60C 19/002 |
| | | | | 152/454 |
| 2009/0199942 | A1 * | 8/2009 | Tanno | B29C 66/304 |
| | | | | 152/157 |
| 2009/0277549 | A1 | 11/2009 | Tanno | |
| 2009/0277551 | A1 * | 11/2009 | Yukawa | B60C 19/002 |
| | | | | 152/450 |
| 2009/0308523 | A1 * | 12/2009 | Kuramori | B29D 30/00 |
| | | | | 156/123 |
| 2011/0056612 | A1 * | 3/2011 | Sugimoto | C08L 53/00 |
| | | | | 156/110.1 |
| 2015/0042001 | A1 * | 2/2015 | Dubos | B29D 30/0654 |
| | | | | 425/103 |
| 2016/0303923 | A1 | 10/2016 | Tanno et al. | |
| 2017/0008353 | A1 * | 1/2017 | Kishizoe | B60C 11/0083 |
| 2018/0133934 | A1 * | 5/2018 | Balnis | B60C 1/0008 |
| 2019/0084358 | A1 * | 3/2019 | Lee | B60C 11/0309 |
| 2019/0382517 | A1 * | 12/2019 | Zhou | C08F 212/08 |

FOREIGN PATENT DOCUMENTS

| | | |
|---|---|---|
| JP | 2008-044574 | 2/2008 |
| JP | 2008-050408 | 3/2008 |
| JP | 5267288 | 8/2013 |
| JP | 2015-128893 | 7/2015 |
| KR | 20130107012 A * | 10/2013 |
| WO | WO 2015/083727 | 6/2015 |
| WO | WO-2015111314 A1 * | 7/2015 ......... B60C 11/0008 |

OTHER PUBLICATIONS

Naoki Yugawa, JP-2008050408-A, updated machine translation. (Year: 2008).*
Naoki Yugawa, JP-2005138760-A, updated machine translation. (Year: 2005).*
Yugawa N, JP-2005138760-A, machine translation. (Year: 2005).*
Lee Joon Seok, KR 20130107012 A, machine translation. (Year: 2013).*
Michael Merry, How to Calculate Silicon from Silica, Sciencing, Apr. 24, 2017, pp. 1-13. (Year: 2017).*
International Search Report for International Application No. PCT/JP2018/032398 dated Nov. 27, 2018, 4 pages, Japan.

* cited by examiner

PNEUMATIC TIRE AND METHOD FOR MANUFACTURING THE SAME

TECHNICAL FIELD

The present technology relates to a pneumatic tire suitable as a winter tire and a method for manufacturing the same, and particularly relates to a pneumatic tire that can reduce cavernous resonance using a sound absorbing member and enhance snow performance, and a method for manufacturing the same.

BACKGROUND ART

A studless or studded winter pneumatic tire is provided with a plurality of sipes in a tread pattern to exhibit snow performance. In order to ensure snow traction and improve snow performance, it is effective to increase the sipe density by increasing the number of sipes. In addition, in order to improve snow performance, it is also effective to use a soft rubber (rubber with a low JIS (Japanese Industrial Standard) hardness) as a tread rubber. However, because the tread rubber becomes hard when used on snow-covered road surfaces, there is a problem in that the desired tire performance may not be exhibited.

On the other hand, one of the causes for tire noise being generated is cavernous resonance due to vibration of air in the tire cavity. This cavernous resonance occurs when a tread portion of a tire that contacts a road surface vibrates due to unevenness or the like of the road surface when a vehicle is driven, and this vibration vibrates the air in the tire cavity portion. Even of this cavernous resonance, sound in a particular frequency band is perceived as noise, so reducing the sound pressure level (noise level) in that frequency band is important for reducing the cavernous resonance.

A known method for reducing such cavernous resonance includes adhering a sound absorbing member to the inner circumferential surface of the tread portion by an adhesive or the like (for example, refer to Japan Patent No. 5267288). However, for winter pneumatic tires, there has been less demand to reduce cavernous resonance, and thus, a sound absorbing member such as described above has not been applied.

SUMMARY

The present technology provides a pneumatic tire that is capable of reducing cavernous resonance with a sound absorbing member and improve snow performance, and a method for manufacturing the same.

In a pneumatic tire according to an embodiment of the present technology for achieving the object described above, a sound absorbing member is fixed to an inner surface of a tread portion via an adhesive layer along a tire circumferential direction, a thickness of the sound absorbing member is 20 mm or greater, a hardness of the sound absorbing member is from 80 N/314 cm$^2$ to 150 N/314 cm$^2$, a tensile strength of the sound absorbing member is 90 kPa or greater, an elongation at break of the sound absorbing member is 130% or greater, and a JIS hardness of a tread rubber of the tread portion is from 50 to 68, and the pneumatic tire comprises a plurality of sipes in a land portion formed in the tread portion.

In a method for manufacturing a pneumatic tire according to an embodiment of the present technology, the pneumatic tire comprises a sound absorbing member on an inner surface of a tread portion, wherein a thickness of the sound absorbing member is 20 mm or greater, a hardness of the sound absorbing member is from 80 N/314 cm$^2$ to 150 N/314 cm$^2$, a tensile strength of the sound absorbing member is 90 kPa or greater, an elongation at break of the sound absorbing member is 130% or greater, a JIS hardness of a tread rubber of the tread portion is from 50 to 68, and the pneumatic tire comprises a plurality of sipes in a land portion formed in the tread portion; and the method comprises:

vulcanizing a green tire using a bladder provided with a coating layer comprising a release agent; and arranging an adhesive layer along a tire circumferential direction on the inner surface of the tread portion of the vulcanized pneumatic tire and fixing the sound absorbing member.

As a result of diligent research on a pneumatic tire suitable as a winter tire and its manufacturing method, the present inventors discovered that by disposing a sound absorbing member for winter pneumatic tires, not only can cavernous resonance be reduced, but also snow performance may be effectively improved, which led to the present technology.

In the present technology, the sound absorbing member is fixed to an inner surface of a tread portion via an adhesive layer in the tire circumferential direction, a thickness of the sound absorbing member is 20 mm or greater, a hardness of the sound absorbing member is from 80 N/314 cm$^2$ to 150 N/314 cm$^2$, a tensile strength of the sound absorbing member is 90 kPa or greater, an elongation at break of the sound absorbing member is 130% or greater, a JIS hardness of the tread rubber of the tread portion is from 50 to 68, and a plurality of sipes are provided in a land portion formed in the tread portion. Thus, in studless or studded winter pneumatic tires, due to the sound absorbing member being fixed to the tire inner surface, the tread portion may store heat, and the temperature decrease of the tread portion may be suppressed. As a result, it becomes possible to suppress an increase in Hs of the tread rubber, and improve the snow performance. In addition, due to the sound absorbing member fixed to the inner surface of the tire, it becomes possible to reduce cavernous resonance.

In the present technology, the hardness of the sound absorbing member, the tensile strength of the sound absorbing member, and the elongation at break of the sound absorbing member are measured in accordance with JIS-K6400. For measuring the hardness of the sound absorbing member, a D method is used in the hardness test of the sound absorbing member. Moreover, the JIS hardness is a durometer hardness measured at a temperature of 20° C. using an A type durometer according to JIS-K6253.

In the present technology, a volume of the sound absorbing member is preferably from 5% to 40% with respect to a cavity volume of the tire. As a result, it is possible to further obtain both the sound absorbing effect and the heat accumulation effect of the sound absorbing member. The cavity volume of the tire is a volume of a hollow portion formed between the tire and the rim in a state where the tire is mounted on the regular rim and the tire is inflated to the regular internal pressure. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire & Rim Association, Inc.), and refers to a "measuring rim" in the case of ETRTO (European Tyre and Rim Technical Organisation). However, when the tire is an original equipment tire, the volume of the space is calculated using a genuine wheel on which the tire is mounted. "Regular internal pressure" is an air pressure defined by standards for each tire according to a system of standards that includes standards on which tires are based, and refers to the "maximum air pressure" in the case of JATMA, refers to the maximum value in the table of "Tire Load Limits at Various Cold Inflation Pressures" in the case of TRA, and refers to the "Inflation Pressure" in the case of ETRTO, however, the air pressure which is displayed on the vehicle is used in a case where the tire is an original equipment tire.

In the present technology, preferably a center position of the sound absorbing member in a width direction is arranged in a range of ±10 mm with respect to a tire equator. The center portion having a large contact area contributes greatly to snow performance, so by disposing the sound absorbing member in this way, a sufficient heat storage effect can be obtained in the center portion, so it becomes possible to effectively improve snow performance. In particular, it is more preferable that the center portion be arranged in a range of ±5 mm with respect to the tire equator.

In the present technology, by performing vulcanization using a bladder provided with a coating layer comprising a release agent, it is possible to set the thickness of the release agent on the tire inner surface to from 0.1 μm to 100 μm or to make the amount of silicon in the release agent to be from 0.1 wt. % to 10.0 wt. %. When the release agent is attached to the tire inner surface in this manner, the release agent inhibits the permeation of air from the tire inner surface and improves air retention, while at the same time sufficiently ensures adhesion between the tire inner surface and the sound absorbing member.

In the present technology, preferably a peeling adhesive strength of the adhesive layer is from 5 N/20 mm to 100 N/20 mm. This facilitates the processes of bonding the sound absorbing member and removing the member when the tire is being disposed of while maintaining satisfactory anchoring strength on the part of the sound absorbing member. The peeling adhesive strength of the adhesive layer is measured according to JIS-Z0237. In other words, a double-sided adhesive sheet is lined with a 25-μm thick PET (polyethylene terephthalate) film. Test pieces are prepared by cutting the lined adhesive sheet into 20 mm by 200 mm squares. The release liner is peeled off a test piece, and the exposed adhesive surface is attached to a stainless steel (SUS304, surface finish BA (bright annealed)) plate as an adherend by reciprocating a 2 kg roller. After holding the test piece in a 23° C., RH 50% environment for 30 minutes, the test piece is peeled at a peel angle of 180° from the SUS plate in a 23° C., RH (relative humidity) 50% environment at a tensile speed of 300 mm/minute using a tensile tester to measure the peeling adhesive strength in accordance with JIS Z0237.

In the present technology, the adhesive layer preferably comprises a double-sided adhesive tape, and a total thickness of the adhesive layer is preferably from 10 μm to 150 μm. Accordingly, followability with respect to the deformation at the time of forming is ensured.

In the present technology, the sound absorbing member preferably comprises a missing portion in at least one location in the tire circumferential direction. As a result, it is possible to withstand for a long time the expansion due to inflation of the tire and the shearing strain of the adhering surface caused by rolling contact with the ground.

DETAILED DESCRIPTION

Figure 1:
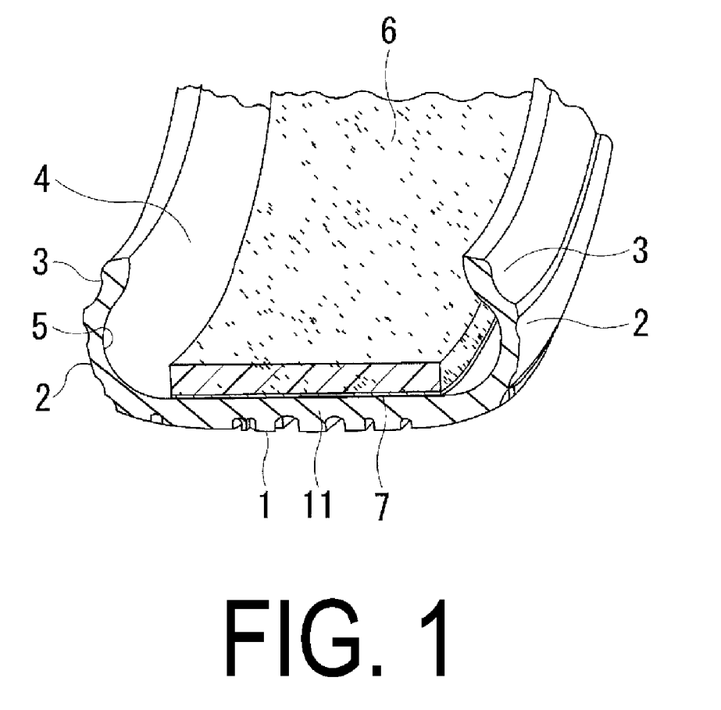
FIG. 1 is a perspective cross-sectional view of a pneumatic tire according to an embodiment of the present technology.
Figure 2:
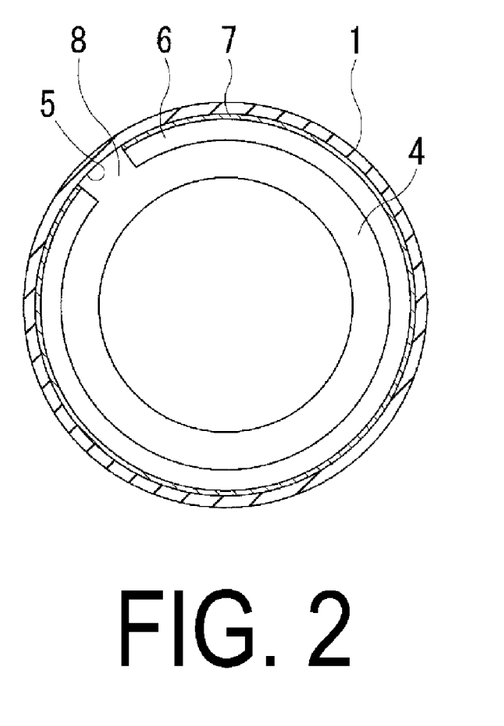
FIG. 2 is a cross-sectional view taken along the equator line of the pneumatic tire according to an embodiment of the present technology.

Configurations of embodiments of the present technology will be described in detail below with reference to the accompanying drawings. FIGS. 1 and 2 illustrate a pneumatic tire according to an embodiment of the present technology. As illustrated in FIG. 1, the pneumatic tire according to the present embodiment includes an annular tread portion 1 extending in the tire circumferential direction, a pair of sidewall portions 2 disposed on both sides of the tread portion 1, and a pair of bead portions 3 disposed on the inner sides of the sidewall portions 2 in the radial direction of the tire.

The tread portion 1 is composed of a tread rubber 11, and this tread rubber 11 is exposed at the outermost side of the pneumatic tire in the radial direction of the tire, with the surface thereof becoming the contour of the pneumatic tire. A plurality of main grooves extending in the tire circumferential direction are formed on the surface of the tread portion 1, and a plurality of ribs are defined in the tread portion 1 by these main grooves. A plurality of sipes (not illustrated) extending in the tire lateral direction is formed in each rib. The sipes are narrow grooves having a groove width of 1.0 mm or less.

A ring-shaped sound absorbing member 6 illustrated in FIG. 2 is attached to the cavity portion 4 surrounded by the tread portion 1, the sidewall portions 2, and the bead portions 3. This sound absorbing member 6 is disposed in a band shape in a region corresponding to the tread portion 1 of the tire inner surface 5. The sound absorbing member 6 is fixed to a region corresponding to the tread portion 1 of the tire inner surface 5 via an adhesive layer 7 along the tire circumferential direction. The sound absorbing member 6 is made of a porous material with open cells, and has predetermined noise absorbing properties based on the porous structure. Polyurethane foam is preferably used as the porous material of the sound absorbing member 6. The adhesive layer 7 is not particularly limited, and for example, an adhesive or double-sided adhesive tape may be used.

In the pneumatic tire described above, the hardness of the sound absorbing member 6 is 80 N/314 cm$^2$ to 150 N/314 cm$^2$, the tensile strength of the sound absorbing member 6 is 90 kPa or greater, and the elongation at break of the sound absorbing member 6 is 130% or greater. The sound-absorbing member 6 having such physical properties is particularly excellent in durability against the shear strain of the adhesive surface caused by expansion due to inflation of the tire and rolling on the ground. Here, when the hardness of the sound absorbing member 6 is less than 80 N/314 cm$^2$, the sound absorbing member 6 tends to compress and deform due to centrifugal force when the tire is running, and when the hardness of the sound absorbing member 6 exceeds 150 N/314 cm$^2$, the sound absorbing member 6 cannot follow the deformation of the tire when running and may break. In addition, the tensile strength of the sound absorbing member 6 is preferably 200 kPa or less, and the elongation at break of the sound absorbing member 6 is preferably 500% or less.

In the pneumatic tire described above, the JIS hardness of the tread rubber 11 of the tread portion 1 is from 50 to 68. When the JIS hardness of the tread rubber 11 of the tread portion 1 is set in a range as described above, the tread portion 1 flexibly conforms to the road surface and is thus suitable for a winter pneumatic tire.

In the pneumatic tire described above, the sound absorbing member 6 is fixed to the inner surface of the tread portion 1 via the adhesive layer 7 in the tire circumferential direction, the thickness of the sound absorbing member 6 is 20 mm or greater, the hardness of the sound absorbing member 6 is from 80 N/314 cm$^2$ to 150 N/314 cm$^2$, the tensile strength of the sound absorbing member 6 is 90 kPa or greater, the elongation at break of the sound absorbing member 6 is 130% or greater, the JIS hardness of the tread rubber 11 of the tread portion 1 is from 50 to 68, and the sipes are provided in the land portion formed in the tread portion 1. Thus, in a studless or studded winter pneumatic tire, heat is stored in the tread portion 1 by the sound absorbing member 6 fixed to the tire inner surface 5, whereby a decrease in temperature of the tread portion 1 can be suppressed. As a result, an increase in Hs of the tread rubber 11 can be suppressed, and snow performance can be improved. In addition, the sound absorbing member 6 fixed to the tire inner surface 5 can reduce cavernous resonance.

In the pneumatic tire described above, the center position of the sound absorbing member 6 in the width direction is preferably disposed in a range of ±10 mm with respect to the tire equator, and more preferably is disposed in a range of ±5 mm with respect to the tire equator. The center portion having a large ground contact area contributes greatly to the snow performance, so by disposing the sound absorbing member 6 in this manner, a sufficient heat accumulation effect may be obtained in the center portion, and snow performance can be effectively enhanced.

The volume of the sound absorbing member 6 is preferably from 5% to 40% with respect to the cavity volume of the tire, and is more preferably from 20% to 30% with respect to the cavity volume of the tire. In addition, the width of the sound absorbing member 6 is more preferably from 30% to 90% with respect to the tire ground contact width. As a result, it is possible to further obtain both the sound absorbing effect and the heat accumulation effect by the sound absorbing member 6. Here, when the volume of the sound absorbing member 6 is less than 5% of the cavity volume of the tire, both the sound absorbing effect and the heat accumulation effect cannot be appropriately obtained. Additionally, when the volume of the sound absorbing member 6 exceeds 40% with respect to the inner cavity volume of the tire, the reduction effect of noise due to cavernous resonance plateaus, and a further reduction effect cannot be expected.

In the pneumatic tire described above, the peeling adhesive strength of the adhesive layer 7 is preferably from 5 N/20 mm to 100 N/20 mm. By appropriately setting the peeling adhesive strength of the adhesive layer 7 in this manner, it becomes possible to easily perform the work of attaching the sound absorbing member 6 and the removal work when disposing of the tire while maintaining a good fixing strength of the sound absorbing member 6. Examples of the adhesive that forms the adhesive layer 7 include acrylic-based adhesives, rubber-based adhesives, and silicone-based adhesives, and the adhesive layer 7 is preferably composed of any of these adhesives. In particular, silicone-based adhesives are preferable, and adhesion with the sound absorbing member 6 is excellent because there is no temperature dependency of the adhesion even when the release agent remains. In addition, acrylic-based adhesives have excellent heat resistance and are therefore suitable in high speed regions.

The adhesive layer 7 is made of double-sided adhesive tape, and is preferably configured so that the total thickness of the adhesive layer 7 is from 10 µm to 150 µm. By configuring the adhesive layer 7 in this manner, it is possible to ensure followability with respect to deformation during forming. Here, when the total thickness of the adhesive layer 7 is less than 10 µm, the strength of the double-sided adhesive tape is insufficient, and the adhesion to the sound absorbing member 6 may not be sufficiently ensured, and when the total thickness of the adhesive layer 7 exceeds 150 µm, heat dissipation will be inhibited when traveling at high speeds, and thus high-speed durability may decrease.

The adhesive layer 7 is preferably a double-sided adhesive tape including only an adhesive, or a double-sided adhesive tape including an adhesive and a nonwoven fabric. In the case of a double-sided adhesive tape including only an adhesive (in the case of a double-sided adhesive tape without a base material as a support that supports the adhesive), heat dissipation is not hindered, so deterioration of high-speed durability may be suppressed, and the followability to tire deformation is excellent. Furthermore, in the case of a double-sided adhesive tape including an adhesive and a nonwoven fabric (in the case of a double-sided adhesive tape having a nonwoven fabric as a base material), high-speed durability and followability can be achieved. Here, when the base material is made of a hard material such as polyethylene terephthalate (PET), peeling easily occurs between the base material and the adhesive or between the tire and the adhesive when the tire deforms, leading to the sound absorbing member 6 falling off. In addition, in a case where the strength at break or the elongation at break of the base material are low, the base material itself may be damaged. When the base material is formed from acrylic foam, the thickness is great, so the high-speed durability tends to deteriorate.

As illustrated in FIG. 2, the sound absorbing member 6 preferably has a missing portion 8 in at least one location in the tire circumferential direction. The missing portion 8 is a portion where the sound absorbing member 6 is not present on the tire circumference. By providing the missing portion 8 in the sound absorbing member 6, it is possible to withstand long-term shear strain of the adhering surface caused by expansion due to inflation of the tire and rolling on the ground, and it is possible to effectively alleviate shear strain generated on the adhering surface of the sound absorbing member 6. This kind of missing portion 8 may be provided on the tire circumference at one location or three to five locations. That is, when the missing portions 8 are provided at two locations on the tire circumference, tire uniformity due to mass unbalance significantly deteriorates, and when the missing positions 8 are provided at six or more locations on the tire circumference, production cost significantly increases.

Note that in cases where missing portions 8 are provided at two or more locations on the tire circumference, the sound absorbing member 6 is cut in the tire circumferential direction. However, even in such cases, for example, when the plurality of sound absorbing members 6 are connected to each other in other laminates such as the adhesive layer 7 made of double-sided adhesive tape, the sound absorbing member 6 may be handled as an integral member, so it is possible to easily bond the sound absorbing member 6 to the tire inner surface 5.

Figure 3:
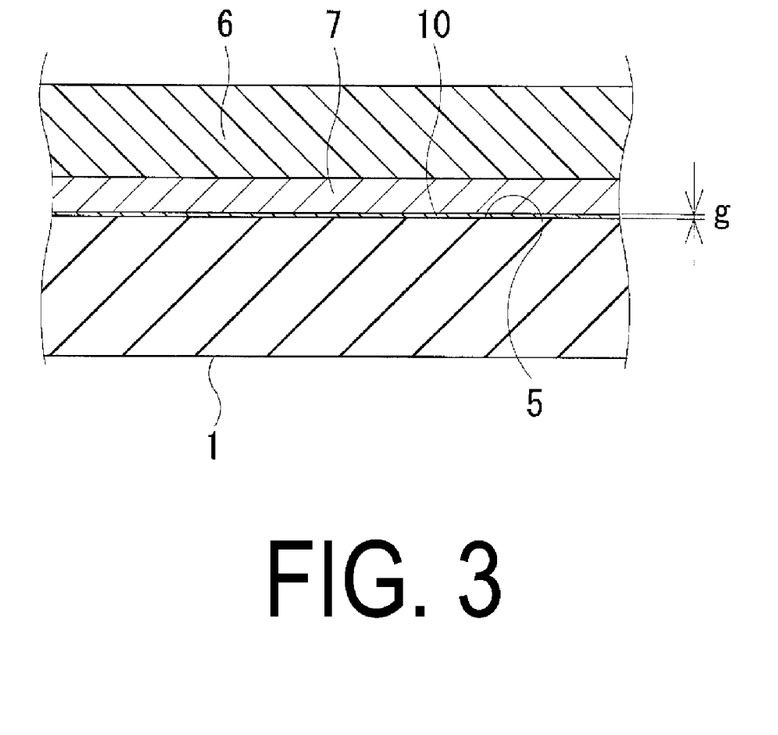
FIG. 3 is an enlarged cross-sectional view illustrating a portion of a modified example of the pneumatic tire according to an embodiment of the present technology.

FIG. 3 illustrates a modified example of a pneumatic tire according to an embodiment of the present technology. As illustrated in FIG. 3, a transfer layer 10 of a release agent is present between the tire inner surface 5 and the adhesive layer 7. In other words, the sound absorbing member 6, the adhesive layer 7, and the transfer layer 10 of the release agent are layered in that order from the inner side in the tire radial direction. This release agent transfer layer 10 is transferred to the tire inner surface 5 in a vulcanized pneumatic tire by vulcanizing a green tire using a bladder having a coating layer made of a release agent. The release agent transferred in this manner is not transferred to the entire surface of the tire inner surface 5 and is scattered.

A thickness g of the release agent transfer layer 10 illustrated in FIG. 3 is preferably from 0.1 μm to 100 μm in at least the fixed region of the sound absorbing member 6 on the tire inner surface 5. The thickness g of the release agent transfer layer 10 can be detected using an electron microscope. When measuring the thickness g of the release agent transfer layer 10 with an electron microscope, a sample obtained by cutting the pneumatic tire along the tire width direction is used, and the thicknesses of a plurality of locations (for example, 4 locations in the tire circumferential direction and 3 locations in the tire width direction) in the sample are measured. Then, the thickness g (average thickness) of the release agent transfer layer 10 is calculated by averaging the measurement values measured at the plurality of locations.

On the other hand, the amount of silicon of the release agent on the inner surface of the tread portion 1 is preferably from 0.1 wt. % to 10.0 wt. %. In the present technology, when specifying the amount of the release agent on the inner surface of the tread portion 1, the amount of silicon that is a main component of a general release agent is used as an index. The amount of silicon can be detected using X-ray fluorescence analysis, and generally, X-ray fluorescence analysis includes a fundamental parameter (FP) method and a calibration curve method, however, in the present technology, the FP method is used. When measuring the amount of the release agent (silicon), sheet samples (size: width 70 mm, length: 100 mm) obtained by peeling the carcass layer and the inner liner layer at a plurality of locations (for example, four locations in the tire circumferential direction and three locations in the tire width direction, total of seven locations) of the pneumatic tire are used, and with a total of five measurement samples (dimensions: width from 13 mm to 15 mm, length from 35 mm to 40 mm) of four corner locations and one central portion location being extracted from each sheet sample, the amount of release agent in each measurement sample is measured using an X-ray fluorescence analyzer. The amount of the release agent for each sheet sample is calculated by averaging the measurement values of the five measurement samples for each sheet sample, and each of the calculated values is included in the range of 0.1 wt. % to 10.0 wt. %. In addition, a fluorescent X-ray particle has a specific energy proportional to the atomic number, and an element can be specified by measuring this specific energy. More specifically, the intrinsic energy of silicon is 1.74±0.05 keV. Note that the number of fluorescent X-ray particles (X-ray intensity) of the release agent (silicon) is in the range of 0.1 cps/μA to 1.5 cps/μA.

Examples of components that can be mixed with the transfer layer 10 composed of the release agent include, for example, a silicone component as an active component. Examples of the silicone component may include organopolysiloxanes such as dialkyl polysiloxane, alkylphenyl polysiloxane, alkylaralkyl polysiloxane, 3,3,3-trifluoropropylmethyl polysiloxane and the like. The dialkyl polysiloxane is, for example, dimethyl polysiloxane, diethyl polysiloxane, methyl isopropyl polysiloxane, methyl dodecyl polysiloxane or the like. The alkylphenyl polysiloxane is, for example, methylphenyl polysiloxane, dimethylsiloxane/methylphenylsiloxane copolymer, dimethylsiloxane/diphenylsiloxane copolymer or the like. The alkylaralkyl polysiloxane is, for example, methyl(phenylethyl) polysiloxane, methyl(phenylpropyl) polysiloxane or the like. These organopolysiloxanes may be used alone or in combination of two or more.

By performing vulcanization using a bladder having a coating layer composed of a release agent as described above, the thickness g of the release agent on the tire inner surface 5 may be set to from 0.1 μm to 100 μm, or the amount of silicon of the release agent may be set to from 0.1 wt. % to 10.0 wt. %. When a small amount of the release agent is attached to the tire inner surface 5 in this way, the release agent inhibits air permeation from the tire inner surface 5 and air retention is improved, while adhesiveness between the tire inner surface 5 and the sound absorbing member 6 can be sufficiently secured. Here, when the thickness of the release agent on the tire inner surface 5 is less than 0.1 μm or the amount of silicon in the release agent is less than 0.1 wt. %, the air retention cannot be improved. On the other hand, when the thickness of the release agent is greater than 100 μm or the amount of silicon in the release agent is greater than 10.0 wt. %, the adhesiveness of the sound absorbing member 6 is deteriorated and sufficient durability may not be obtained.

Next, the method of manufacturing the pneumatic tire of the present technology will be described. In vulcanizing the green tire, a release agent is coated (preferably baked and applied) on the bladder in advance to form a coating layer made of the release agent on the outer surface of the bladder. The step of forming a coating layer on the outer surface of the bladder is performed, for example, while storing under conditions of 150° C. for 1 hour, 90° C. for 4 hours, or room temperature for 8 hours after applying the release agent. In addition, the step of forming the coating layer on the outer surface of the bladder is performed no less than 1 time and no greater than 3 times. The green tire is vulcanized using a bladder on which a coating layer is formed in this manner. In the vulcanized tire, the sound absorbing member 6 is fixed to the fixing region of the sound absorbing member 6 on the tire inner surface 5 of the tread portion 1 through the adhesive layer 7 along the tire circumferential direction.

By performing vulcanization using a bladder having a coating layer made of a release agent as described above, it becomes possible to make the thickness of at least the release agent transferred to the fixed region of the sound absorbing member 6 from 0.1 μm to 100 μm, or the amount of silicon in the release agent from 0.1 wt. % to 10.0 wt. %. When a trace amount of the release agent is attached to the tire inner surface 5 in this way, the release agent inhibits air permeation from the tire inner surface 5 and air retention is improved, while adhesiveness between the tire inner surface 5 and the sound absorbing member 6 can be sufficiently ensured.

In particular, in the step of forming the coating layer on the outer surface of the bladder, the coating time t (hours) and the temperature T (° C.) of the coating layer preferably satisfy the conditions of $t \geq -0.0571T + 9.14$ and $10°\,\text{C.} \leq T \leq 180°\,\text{C.}$ In addition, more preferably the temperature T is 90° C. and the coating time t is 4 hours, and even more preferably the temperature T is 150° C. and the coating time t is 1 hour. By satisfying these conditions, the time for coating the release agent on a bladder having a coating layer may be reduced, and shortening of the bladder life may be prevented. Here, the higher the temperature T (° C.) is, the shorter the amount of time in which the coating layer can be formed becomes, however, the bladder is prone to deterioration and the bladder life is reduced.

EXAMPLE

The pneumatic tires of Comparative Examples 1 to 3 and Examples 1 to 6 were manufactured with a tire size of 245/50R18 and including a plurality of sipes on the land portion formed in the tread portion. The presence of a sound absorbing member, the thickness of the sound absorbing member (mm), the JIS hardness of the tread rubber, the thickness of the release agent (μm), and the amount (wt. %) of the release agent (silicon) on the tire inner surface were set as indicated in Table 1.

In Comparative Examples 2 and 3 and Examples 1 to 6, the sound absorbing member had a hardness of 80 N/314 cm$^2$, the sound absorbing member had a tensile strength of 90 kPa, and the sound absorbing member had an elongation at break of 130%. In addition, Comparative Examples 1 to 3 and Examples 1 to 3 were manufactured by vulcanizing a green tire using a normal bladder, and Examples 4 to 6 were manufactured by vulcanizing green tires using a bladder having a coating layer made of a release agent.

Note that in Table 1, the thickness (μm) of the release agent on the tire inner surface was determined by measuring the thickness of the release agent at four locations in the tire circumferential direction and three locations in the tire lateral direction of each of the test tires after the manufacturing step was completed, and these measurements were averaged. Moreover, the amount of the release agent (silicon) on the tire inner surface was calculated on the basis of the amount of release agent (silicon) measured at four locations in the tire circumferential direction and three locations in the tire lateral direction of each test tire after the production step was completed using an energy dispersive X-ray fluorescence analyzer (EDX-720, manufactured by Shimadzu Corporation). The measurement conditions in a vacuum state are: a voltage of 50 kV, a current of 100 μA, an integration time of 50 sec, and a collimator of φ10 mm.

For these test tires, snow performance, cavernous resonance level and durability of the sound absorbing member were evaluated by the following test methods, and the results are given in Table 1.

Snow Performance:

Each test tire was mounted on a wheel having a rim size of 18×7.5, mounted on a test vehicle at an air pressure of 250 kPa, and sensory evaluation was performed by a test driver on a snowy road surface. The evaluation results are expressed as index values with Example 1 being 100. Larger index values indicate superior running performance (snow performance) on the snowy road surface.

Cavernous Resonance Level:

Each test tire was mounted on a wheel having a rim size of 18×7.5, mounted on a test vehicle with an air pressure of 250 kPa, driven on a smooth road surface at a speed of 100 km/h, and sensory evaluation was performed by a test driver. The evaluation results are expressed as index values with Example 1 being 100. Larger index values indicate a lower noise level of the cavernous resonance felt by the test driver, meaning that the noise reduction effect is greater.

Durability of the Sound Absorbing Member:

The adhesion of the sound absorbing member referred to here is an evaluation of the peeling of the adhesive surface between the tire inner surface and the sound absorbing member. Each test tire was mounted on a wheel with a rim size of 18×7.5, and a running test was conducted with a drum tester under the conditions of a running speed of 81 km/h, an air pressure of 120 kPa, a load of 9.0 kN, and a running distance of 6480 km, after which the presence of shedding or peeling was confirmed visually. A case where there is no shedding and peeling of the sound absorbing member is indicated as "excellent"; a case where the peeling of the sound absorbing member was less than ⅛ of the entire sound absorbing member is indicated as "good", a case where the peeling of the sound absorbing member was greater than ⅛ and less than ¼ of the entire sound absorbing member is indicated as "acceptable", and a case where the peeling of the sound absorbing member is greater than ¼ of the entire sound absorbing member is indicated as "unacceptable".

TABLE 1

|  | Comparative Example 1 | Comparative Example 2 | Example 1 | Example 2 | Example 3 |
|---|---|---|---|---|---|
| Presence of sound absorbing member | No | Yes | Yes | Yes | Yes |
| Thickness of sound absorbing member (mm) | — | 20 | 20 | 20 | 20 |
| JIS hardness of tread rubber | 65 | 70 | 65 | 57 | 50 |
| Thickness of release agent on tire inner surface (μm) | 300 | 300 | 300 | 300 | 300 |
| Amount of release agent (silicon) on tire inner surface (wt. %) | 45.0 | 45.0 | 45.0 | 45.0 | 45.0 |
| Snow performance | 97 | 97 | 100 | 103 | 109 |
| Cavernous resonance level | 95 | 100 | 100 | 100 | 100 |
| Durability of sound absorbing member | — | Acceptable | Acceptable | Acceptable | Acceptable |

|  | Comparative Example 3 | Example 4 | Example 5 | Example 6 |
|---|---|---|---|---|
| Presence of sound absorbing member | Yes | Yes | Yes | Yes |

TABLE 1-continued

| | | | | |
|---|---|---|---|---|
| Thickness of sound absorbing member (mm) | 20 | 20 | 20 | 20 |
| JIS hardness of tread rubber | 45 | 50 | 50 | 50 |
| Thickness of release agent on tire inner surface (μm) | 300 | 0.1 | 10 | 100 |
| Amount of release agent (silicon) on tire inner surface (wt. %) | 45.0 | 0.1 | 1.0 | 10.0 |
| Snow performance | 109 | 109 | 109 | 109 |
| Cavernous resonance level | 100 | 100 | 100 | 100 |
| Durability of sound absorbing member | Acceptable | Excellent | Excellent | Good |

As can be seen from Table 1, the pneumatic tires of Examples 1 to 6 had improved snow performance and cavernous resonance levels compared to the pneumatic tire of Comparative Example 1. In Examples 4 to 6, compared to Comparative Example 1, the durability of the sound absorbing member was improved.

On the other hand, in Comparative Example 2, the JIS hardness of the tread rubber was set to be high, so the snow performance was deteriorated. In Comparative Example 3, the same improvement effect as that of Example 3 was obtained for the snow performance and the cavernous resonance level, however, the JIS hardness of the tread rubber was set to be low, and as a result, the wear resistance performance of the tire was negatively affected. In other words, in a case where the JIS hardness of the tread rubber falls below 50, the effects of improving snow performance and cavernous resonance levels tend to be constant and other tire performance tends to decline.

The invention claimed is:

1. A pneumatic tire, comprising:
a plurality of sipes in a land portion formed in a tread portion, the tread portion comprising a tread rubber having a JIS hardness of from 50 to 68; and
a sound absorbing member fixed to an inner surface of the tread portion via an adhesive layer along a tire circumferential direction; wherein
a thickness of the sound absorbing member is 31 mm or greater,
a hardness of the sound absorbing member is more than 80 N/314 cm$^2$ and 150 N/314 cm$^2$ or less,
a tensile strength of the sound absorbing member is 90 kPa or greater,
an elongation at break of the sound absorbing member is 130% or greater,
an amount of silicon in a release agent between the inner surface and the adhesive layer is from 0.1 wt. % to 10.0 wt. %,
the release agent consists only of one or more selected from the group consisting of a dialkyl polysiloxane, an alkylphenyl polysiloxane, an alkylaralkyl polysiloxane, a 3,3,3-trifluoropropylmethyl polysiloxane, or combinations thereof,
the release agent is distributed in a scattered manner on the inner surface such that the release agent is not provided on an entire surface of the inner surface, and
a volume of the sound absorbing member is from 21% to 40% with respect to a cavity volume of the tire.

2. The pneumatic tire according to claim 1, wherein a center position of the sound absorbing member in a width direction is arranged in a range of ±10 mm with respect to a tire equator.

3. The pneumatic tire according to claim 1, wherein a peeling adhesive strength of the adhesive layer is from 5 N/20 mm to 100 N/20 mm.

4. The pneumatic tire according to claim 1, wherein the adhesive layer comprises a double-sided adhesive tape, and a total thickness of the adhesive layer is from 10 μm to 150 μm.

5. The pneumatic tire according to claim 1, wherein the sound absorbing member comprises a missing portion in at least one location in the tire circumferential direction.

6. The pneumatic tire according to claim 1, wherein the elongation at break of the sound absorbing member is from 130% or greater to 190% or less.

7. The pneumatic tire according to claim 1, wherein the JIS hardness of the tread rubber is from 57 to 68.

8. A method for manufacturing a pneumatic tire comprising a plurality of sipes in a land portion formed in a tread portion, the tread portion comprising a tread rubber having a JIS hardness of from 50 to 68, and a sound absorbing member on an inner surface of the tread portion, wherein a thickness of the sound absorbing member is 31 mm or greater, a hardness of the sound absorbing member is more than 80 N/314 cm$^2$ and 150 N/314 cm$^2$ or less, a tensile strength of the sound absorbing member is 90 kPa or greater, and an elongation at break of the sound absorbing member is 130% or greater, the method comprising:
vulcanizing a green tire using a bladder provided with a coating layer comprising a release agent to obtain a vulcanized pneumatic tire; and
arranging an adhesive layer along a tire circumferential direction on the inner surface of the tread portion of the vulcanized pneumatic tire and fixing the sound absorbing member; wherein
an amount of silicon in the release agent detected by X-ray fluorescence analysis in the fixed region of the sound absorbing member is from 0.1 wt. % to 10.0 wt. %,
the release agent consists only of one or more selected from the group consisting of a dialkyl polysiloxane, an alkylphenyl polysiloxane, an alkylaralkyl polysiloxane, a 3,3,3-trifluoropropylmethyl polysiloxane, or combinations thereof,
the release agent is distributed in a scattered manner on the inner surface such that the release agent is not provided on an entire surface of the inner surface, and
a volume of the sound absorbing member is from 21% to 40% with respect to a cavity volume of the tire.

9. The method for manufacturing a pneumatic tire according to claim 8, wherein a center position of the sound absorbing member in a width direction is arranged in a range of ±10 mm with respect to a tire equator.

10. The method for manufacturing a pneumatic tire according to claim 8, wherein a peeling adhesive strength of the adhesive layer is from 5 N/20 mm to 100 N/20 mm.

11. The method for manufacturing a pneumatic tire according to claim 8, wherein the adhesive layer comprises a double-sided adhesive tape, and a total thickness of the adhesive layer is from 10 µm to 150 µm.

12. The method for manufacturing a pneumatic tire according to claim 8, wherein the sound absorbing member comprises a missing portion in at least one location in a tire circumferential direction.

13. A pneumatic tire, comprising:
- a plurality of sipes in a land portion formed in a tread portion, the tread portion comprising a tread rubber having a JIS hardness of from 50 to 68; and
- a sound absorbing member fixed to an inner surface of the tread portion via an adhesive layer along a tire circumferential direction; wherein
- a thickness of the sound absorbing member is 31 mm or greater,
- a hardness of the sound absorbing member is more than 80 N/314 cm$^2$ and 150 N/314 cm$^2$ or less,
- a tensile strength of the sound absorbing member is 90 kPa or greater,
- an elongation at break of the sound absorbing member is from 130% or greater to 190% or less,
- an amount of silicon in a release agent between the inner surface and the adhesive layer is from 0.1 wt. % to 10.0 wt. %,
- the release agent consists only of one or more selected from the group consisting of a dialkyl polysiloxane, an alkylphenyl polysiloxane, an alkylaralkyl polysiloxane, a 3,3,3-trifluoropropylmethyl polysiloxane, or combinations thereof, and
- the release agent is distributed in a scattered manner on the inner surface such that the release agent is not provided on an entire surface of the inner surface.

* * * * *